Patented Apr. 15, 1941

2,238,608

UNITED STATES PATENT OFFICE 2,238,608

METHOD OF MANUFACTURING METALLIC OXIDE RECTIFIERS

Ernst Siebert, Berlin-Siemensstadt, Germany, assignor to Westinghouse Electric & Manufacturing Company, East Pittsburgh, Pa., a corporation of Pennsylvania No Drawing. Application August 11, 1939, Serial No. 289,578. In Germany February 7, 1938

2 Claims. (Cl. 175—366)

This invention relates to a method of manufacturing metallic oxide rectifiers.

When manufacturing metallic oxide rectifiers, particularly cuprous rectifiers, the rectifier elements to be oxidized are first heat treated at a relatively high temperature in an atmosphere containing oxygen and then allowed to cool down in any suitable manner. The cooling method employed in most cases consists in the case of cuprous rectifiers in allowing the copper elements oxidized at a high temperature to cool down at first for a short time in a cooling furnace to an average temperature and then in quenching the same.

It is true that cuprous rectifiers which may be manufactured according to the above-mentioned method have a relatively low resistance in the conducting direction and therefore a relatively high current capacity and a high efficiency; however, the inverse voltage which may be impressed on such rectifiers is not very high. It amounts at most to 5 volts per cell. In many cases it is, however, desirable to manufacture metallic oxide rectifiers for a considerably higher inverse voltage; for instance, up to 15 volts per cell, which rectifiers must, however, be able to carry a large current, such as is the case with standard dry rectifier elements having an inverse voltage of at most 5 volts.

The object of the present invention is to provide a method, whereby such metallic oxide rectifier elements may be manufactured which have a high current capacity and a high inverse voltage.

The novel method of manufacturing metallic oxide rectifiers—in which the rectifier elements heat treated in a furnace in an atmosphere containing oxygen to oxydize the same are subjected in a known manner to an intermediate cooling before being cooled down to room temperature—consists in the fact that the intermediate cooling is effected in steps; i. e., first in a furnace in which prevails a comparatively high temperature and then in a furnace in which the temperature is comparatively low. In the case of cuprous rectifier elements it is of particular advantage to cause the temperature of the intermediate cooling effected in the first step to lie between 600 and 400 degrees centigrade and in the second step between 400 and 200 degrees centigrade. It has been found that it is preferable to keep the oxidized rectifier elements in the furnace in which the first intermediate cooling step is effected for about 10 to 15 minutes and in the furnace in which the second intermediate cooling step is performed for about 5 to 25 minutes.

In this manner it is possible to produce cuprous rectifier elements which are highly conductive in the conducting direction and which have a correspondingly high current capacity and an inverse voltage of 15 volts and more. The number of the rectifier elements for relatively high voltages to be connected in series is thus reduced to about ⅓ of the number of the elements manufactured according to the method hitherto known. Furthermore, the rectifier elements manufactured by the method according to the invention are very uniform and the waste caused thereby is relatively slight. These advantages are seemingly due to the following fact that on the one hand the retardation of the entire cooling process is a prerequisite to the production of a particularly effective blocking film, whereas on the other hand owing to the relatively high temperature prevailing in the second intermediate cooling step, the high conductivity of the plates in the conducting direction attained in the first intermediate cooling step is prevented from being reduced by an appreciable amount.

In order to permanently maintain a high conductivity and to prevent the current even in the case of a relatively high voltage from flowing in the inverse direction, the rectifier elements when cooled down in two steps are preferably quenched in cold water.

It is known to manufacture cuprous rectifier elements for an inverse voltage of 15 volts and more by allowing the copper elements oxidized at a high temperature to cool down gradually in an air atmosphere. The rectifier elements thus manufactured have, however, in the conducting direction a considerably higher resistance than those manufactured according to the known method for normal inverse voltages (up to 5 volts). They can therefore carry only a relatively small current and have as the standard plates a relatively low efficiency, while the output thereof is the same.

What is claimed is:

1. The method of manufacturing copper oxide rectifiers in which the rectifier elements, heat treated at a high temperature in an atmosphere containing oxygen to oxidize the same, are subjected, before being cooled down to room temperature, to an intermediate cooling, characterized in that the temperature in the first step of the intermediate cooling lies between 600 and 400 degrees centigrade and in the second step between 400 and 200 degrees centigrade.

2. The method of manufacturing copper oxide rectifiers in which the rectifier elements, heat treated at a high temperature in an atmosphere containing oxygen to oxidize the same, are subjected, before being cooled down to room temperature, to an intermediate cooling, characterized in that the temperature in the first step of the intermediate cooling lies between 600 and 400 degrees centigrade and in the second step between 400 and 200 degrees centigrade, and further characterized in that the period of the first intermediate cooling step effected in one furnace amounts to about 10 to 50 minutes and that of the second intermediate cooling step effected in another furnace to about 5 to 25 minutes.

ERNST SIEBERT.